United States Patent [19]

Levine et al.

[11] Patent Number: 5,107,436
[45] Date of Patent: Apr. 21, 1992

[54] METHOD FOR GENERATING A TOOL COURSE FOR A CUTTING TOOL

[75] Inventors: Alan R. Levine, Westwood; Pedro H. Moura, Melrose; Brad W. Amidon, Somerville; Willem Jansen, Weston; Melvin Platt, Holleston, all of Mass.

[73] Assignee: Northern Research & Engineering Corp., Woburn, Mass.

[21] Appl. No.: 505,385

[22] Filed: Apr. 6, 1990

[51] Int. Cl.$^5$ .................. G06F 15/40; G05B 19/25
[52] U.S. Cl. .................. 364/474.28; 364/474.35; 318/569
[58] Field of Search .............. 364/474.18, 474.28, 364/474.29, 474.33, 474.35; 318/191, 569, 570

[56] References Cited

U.S. PATENT DOCUMENTS

| | | | |
|---|---|---|---|
| 4,423,481 | 12/1983 | Reid-Green et al. | 364/474.31 |
| 4,491,906 | 1/1985 | Kishi et al. | 364/191 |
| 4,506,331 | 3/1985 | Kishi et al. | 364/191 |
| 4,569,014 | 2/1986 | Kishi et al. | 364/191 |
| 4,698,573 | 10/1987 | Niwa | 318/571 |
| 4,791,579 | 12/1988 | Kranitzky | 364/518 |
| 4,837,703 | 6/1989 | Kakazu et al. | 364/474.18 |
| 4,905,158 | 2/1990 | Seki et al. | 364/474.29 |

Primary Examiner—Jerry Smith
Assistant Examiner—Paul Gordon
Attorney, Agent, or Firm—Glenn B. Foster

[57] ABSTRACT

A method for determining a smooth machining course for a cutting tool during machining of a workpiece. Each possible cutting tool position, with respect to the workpiece, is defined by a separate reference vector. A progression of points are defined as a tool path. A first specified portion of the reference vector will follow the tool path during machining of the workpiece. A series of reference planes are generated, each plane defines a planar set of all possible reference vector positions for each point. An acceptable range from eahc set is established which defines acceptable reference vector positions within each plane for each point. A tool course is generated, which will be followed by a second portion, distant from the first portion, of the reference vector utilizing an algorithm to minimize irregularities of the course, and to contain the course entirely within the acceptable range.

17 Claims, 6 Drawing Sheets

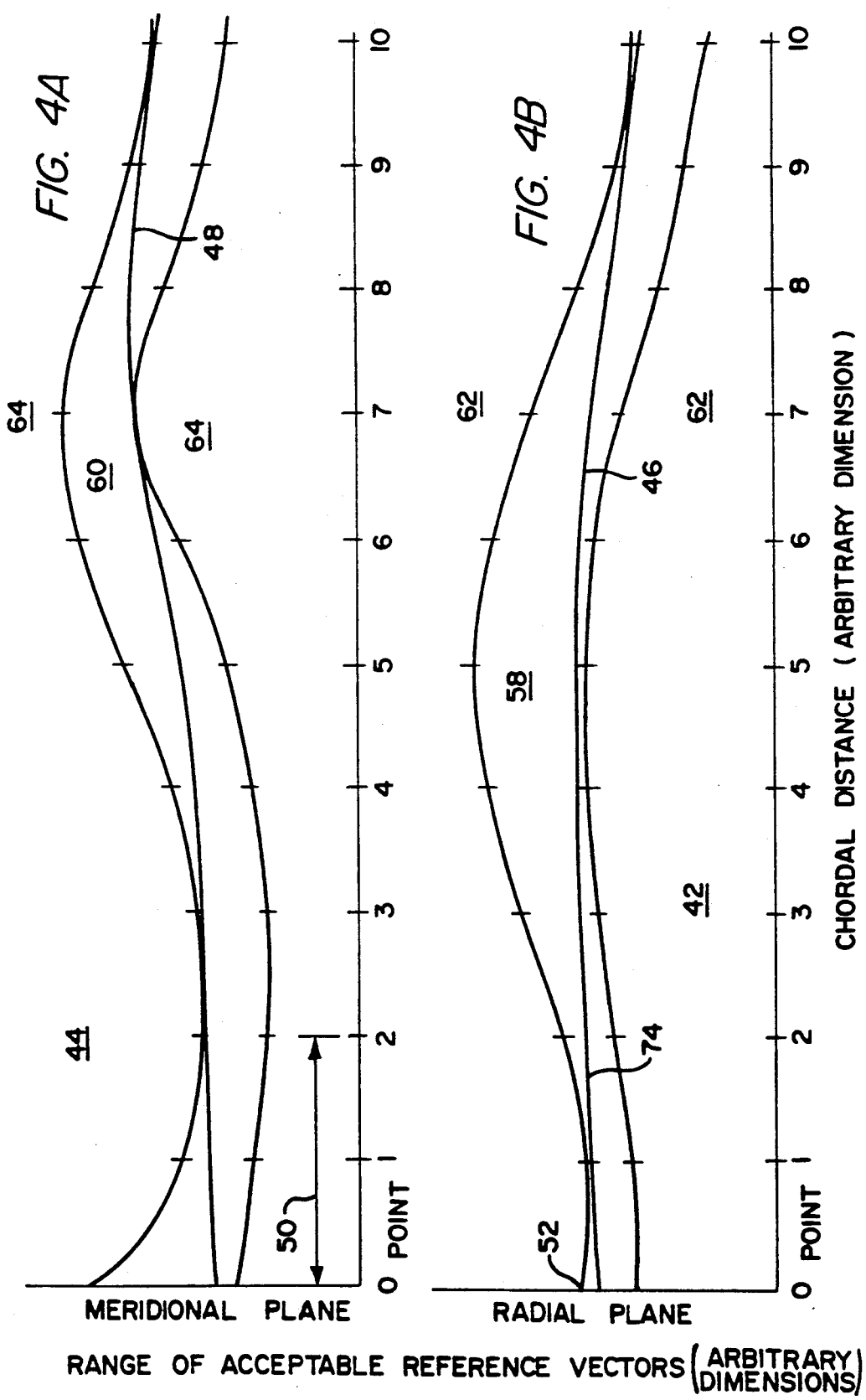

METHOD FOR GENERATING A TOOL COURSE FOR A CUTTING TOOL

BACKGROUND OF THE INVENTION

This invention relates to providing a smooth progression for a cutting tool to follow as a tip of the tool tip follows a specified tool path in machining a workpiece. It is desirable to have a the tool travel as little as possible in following the tool paths. The tool must also not interfere with unintended portions of the workpiece.

Presently, most tool paths are generated by the operator who selects a series of cutting tool positions along the tool path. From these positions, the intermediate tool positions are determined by interpolation. This will not always produce a smooth or a continuous tool travel.

The selection of a proper tool positioning and tool path requires a skilled operator. Even with a skilled operator, constant trial and error of machining the workpieces is required to produce a suitable finished part. This is inherently an extremely expensive process.

The foregoing illustrates limitations known to exist in present cutting tools. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method for determining a smooth machining course for a cutting tool during machining of a workpiece. Each possible cutting tool position, with respect to the workpiece, is defined by a separate reference vector.

A progression of points are defined as a tool path, a first specified portion of the reference vector will follow the tool path during machining of the workpiece. A series of reference planes are generated, each plane defines a planar set of all possible reference vector positions for each point. An acceptable range from each set is established which defines acceptable reference vector positions within each plane for each point. A tool course is generated, which will be followed by a second portion, distant from the first portion, of the reference vector utilizing an algorithm to minimize irregularities of the course, and to contain the course entirely within the acceptable range.

The foregoing and other aspects will become apparent from the following detailed description of the invention when considered in conjunction with the accompanying drawing figures.

BRIEF DESCRIPTION OF THE DRAWING FIGURES

FIGS. 4a and 4b are graphs illustrating chordal distance vs. a progression of angular limits within a radial and a meridional plane;

DETAILED DESCRIPTION

Figure 1:
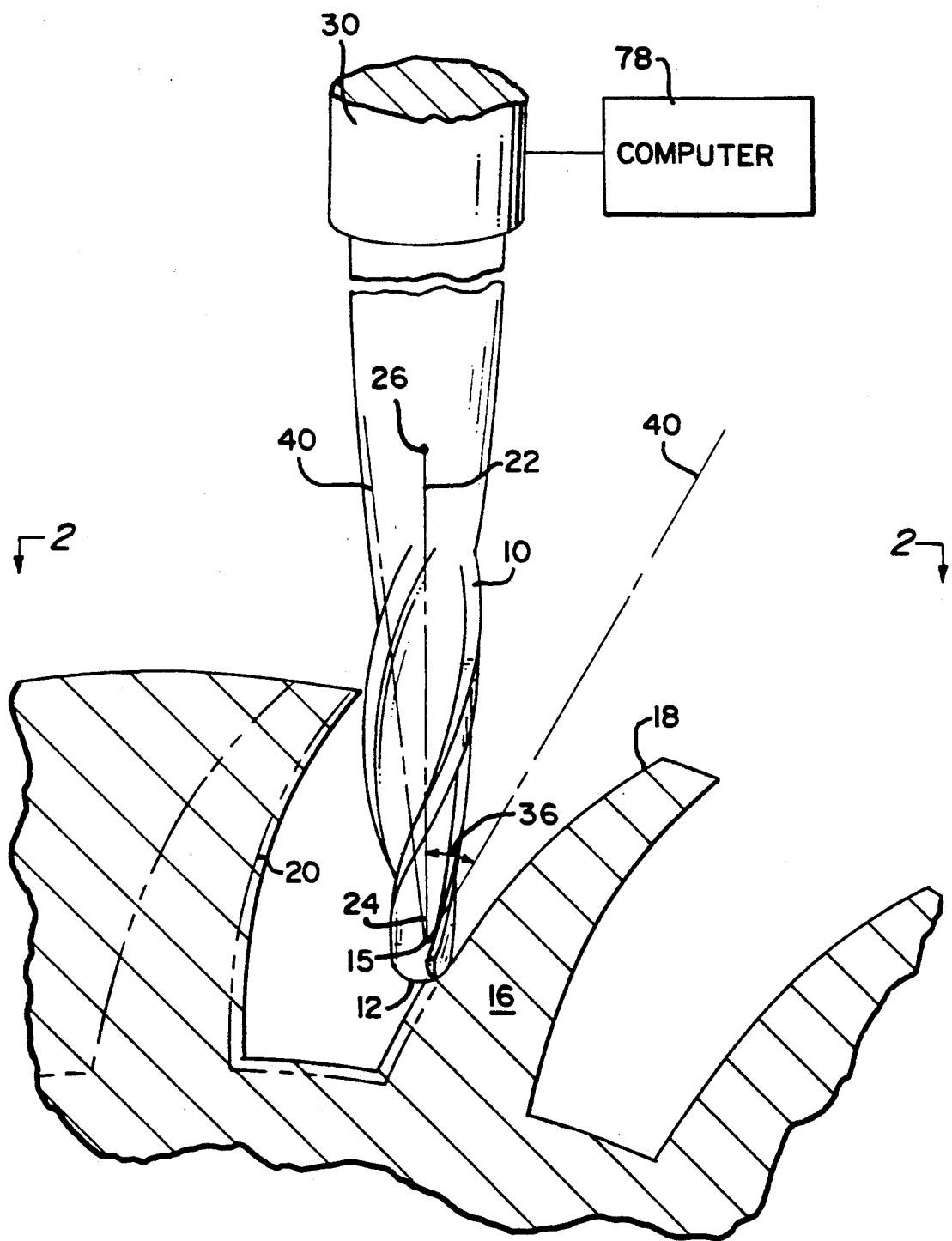
FIG. 1 is a side cross sectional view illustrating one embodiment of a cutting tool interacting with a workpiece, the portion to the right representing a completed part of the workpiece, and the portion to the left representing a non-machined blank, the acceptable cutting range for a specific point on a tool path is shown.
Figure 2:
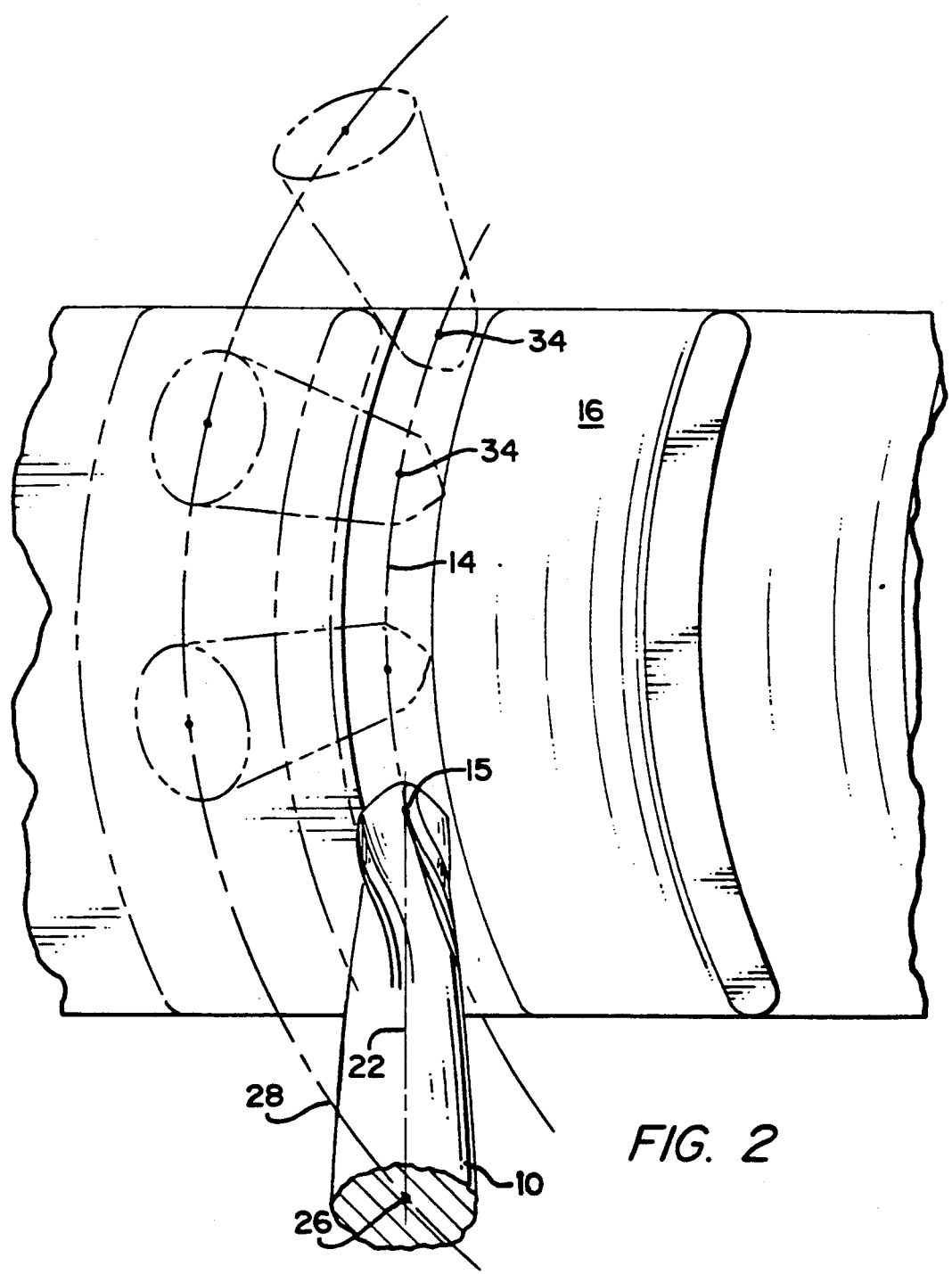
FIG. 2 is a top view, along section lines 2—2, of FIG. 1.
Figure 3:
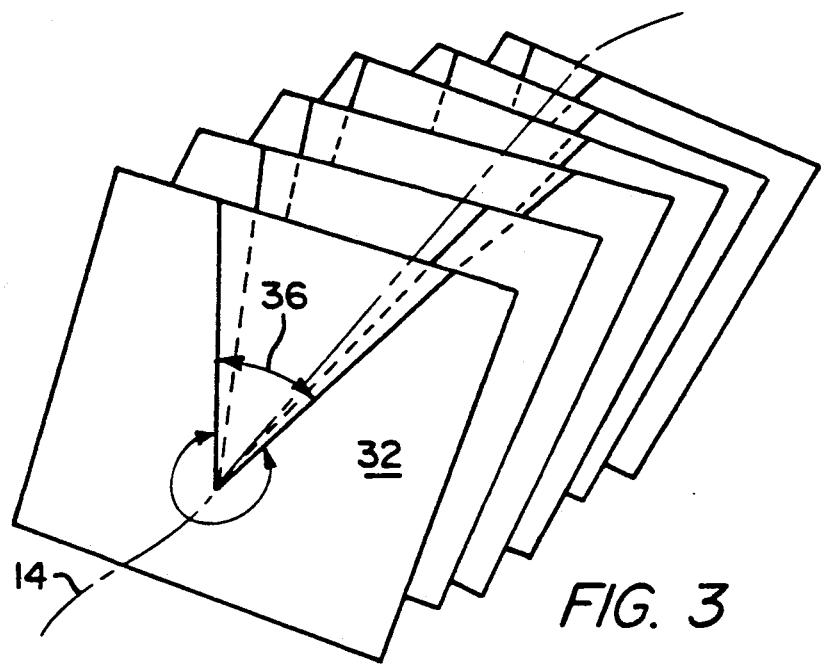
FIG. 3 is view illustrating a progression of reference planes, of one embodiment of this invention.
Figure 5:
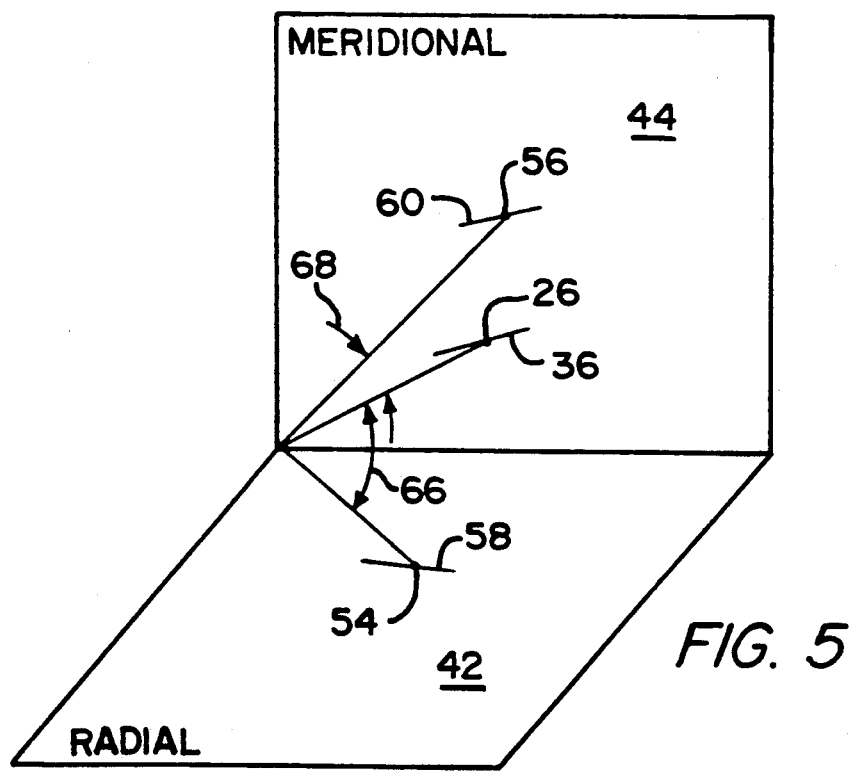
FIG. 5a is a geometric view of how a reference vector is broken into two planar views, as accomplished in one embodiment of the instant invention.

This method has been found to be especially applicable to five axis cutting machines, but may also be applied to machines having different cutting characteristics.

Initially, a tool path 14 is defined by an operator. The tool path may be visualized as a series of points 34 which a first portion 15 of the cutter (preferably a portion near the tip) will follow during machining of a workpiece 16. Portions of the tool path occur between adjacent surfaces 18, 20 to remove material of the workpiece. It is critical that a cutting tool 10 does not inadvertently interfere with surface 20 while machining the workpiece 16.

This invention pertains to the orientation of the cutting tool 10 as a tip 12 of the tool progresses around the tool path 14. The orientation of the tool is represented by a reference vector 22 with a first portion 24 of the vector following the tool path 14. A second portion, or tail, 26 of the vector 22 follows a course 28. The course is distinct from the tool path 14.

The selection of a proper course 28 is critical for proper machining operations. If the course is irregular and jagged, then a cutting machine 30 which produces motion in the cutting tool 10, will also be forced to follow this course. An irregular course takes more time to follow, creates more machine wear, and produces a more unpredictable surface finish than a smooth course. In order to produce a smooth and minimal course 28 from a given tool path 14, the following procedure is followed.

A series of reference planes 32 are generated along the tool path 14. It is preferable to orient one plane 32 for a single point along the tool path 14. The plane should be oriented perpendicularly to the direction of the tool path 14 travel for each point 34. However, different orientations or number of reference planes for a given point are envisioned by this invention.

For each reference plane 32, there will be a different set of allowable range of reference vectors 36. This range 36 may be considered as how the cutting tool 10 may be oriented, for that specific point 34, without creating an interference with the workpiece, or placing the cutting machine 30 in an undesired attitude or through an undesired operation.

Any portion of the reference plane 32 which does not fit within the allowable range 36 will fall into a zone of unacceptable reference vectors 32. The range 36 and the zone 32 are divided by a limit 40. The reference planes 32 must be spaced close enough together to reliably indicate progression of the limit 40 from one reference plane to the next plane.

Even though a course 28 could be generated through the reference planes 32 using a three dimensional algorithm, computations are simplified if the acceptable range is projected onto a plurality of computational planes 42, 44. A set of two dimensional curves 46, 48 are then generated for each of the planes, and then the two dimensional curves are combined forming the three dimensional course 28. This procedure is accomplished as follows.

Figure 6:
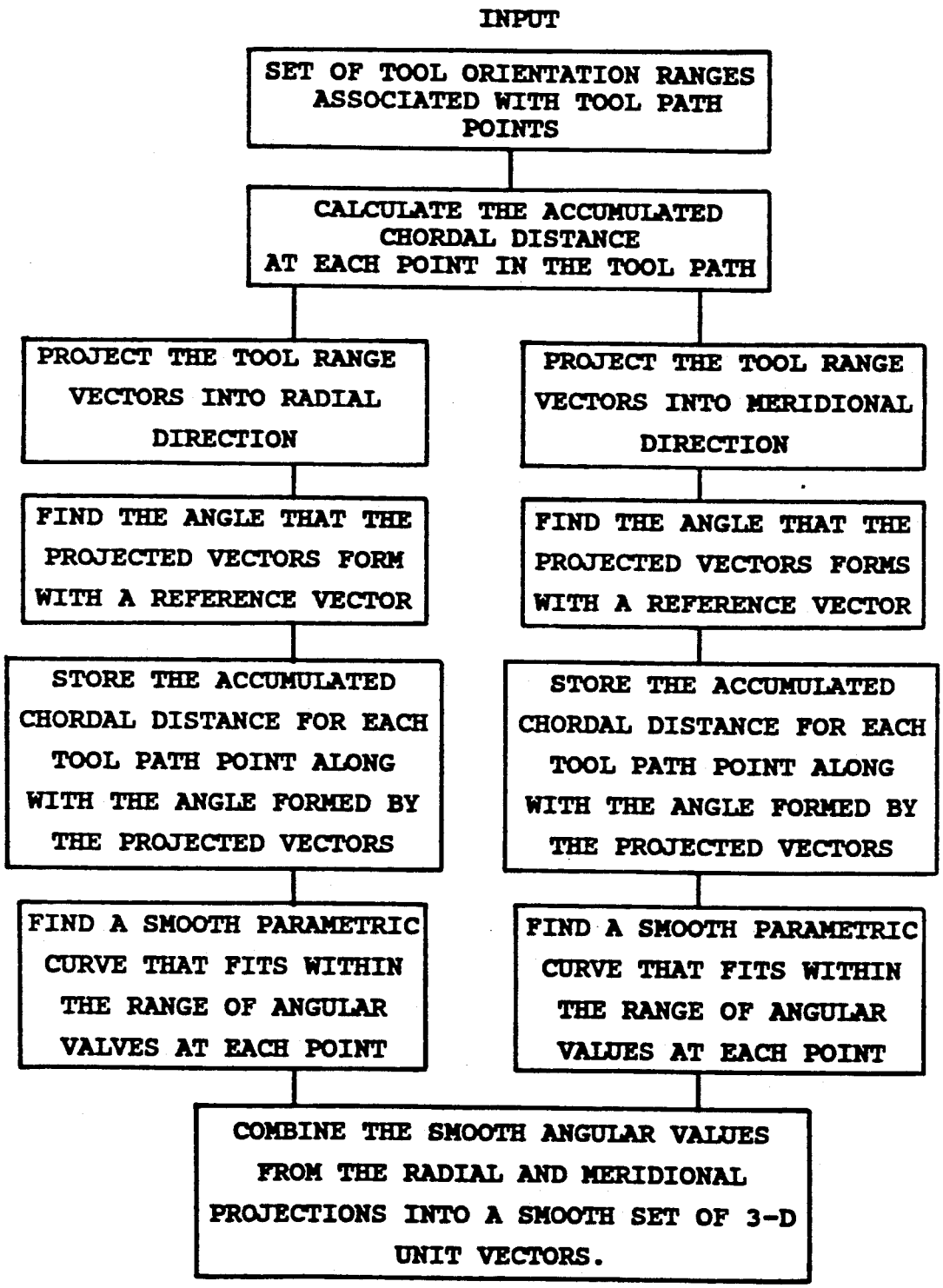
FIG. 6 is a table illustrating one embodiment of how a smooth and continuous three dimensional cutting tool path can be derived from a progression of acceptable reference vector ranges.

A first step of FIG. 6 is the input of the allowable reference vector ranges 36 for each point 34 within the tool path 14. Step two relates a chordal distance 50 (the accumulated straight line distance from an origin 52 of the tool path through each point 34 on the tool path where a reference plane 32 was generated) to the angular limits 40 of the reference plane 32.

The reference vector 22 for each reference plane is preferably broken into two components (a radial component 54 and a meridional component 56) and projected on the radial plane 42 and the meridional plane 44, respectively.

For each plane 42, 44, an acceptable two dimensional radial range 58 and meridional range 60 are projected onto each of the planes 42, 44. The unacceptable zones are 62 and 64. Projection angles 66, 68 between the components 54, 56 and the reference vector are then determined. A separate graph similar to FIG. 4 can thereupon be derived for each allowable range 58, 60.

For each plane 42, 44, an algorithm is used to derive the parametric curve 46, 48 for each allowable range 58, 60. Any discontinuity in either curve 46, 48 will cause irregular cutting tool 10 motion.

An algorithm may be used for this application, in which a plurality of piecewise cubic curves are connected at junctions where the two curves share the same differential. It is preferable to use a minimum of curved segments in forming curves 46, 48. The curves remain within the allowable ranges 58, 60.

Once the smooth curve 46, 48 has been obtained for each plane 42, 44, the curves are combined to provide the three dimensional course 28. Even though these computations could be accomplished manually, a computer 78 greatly simplifies this analysis.

Figure 7:
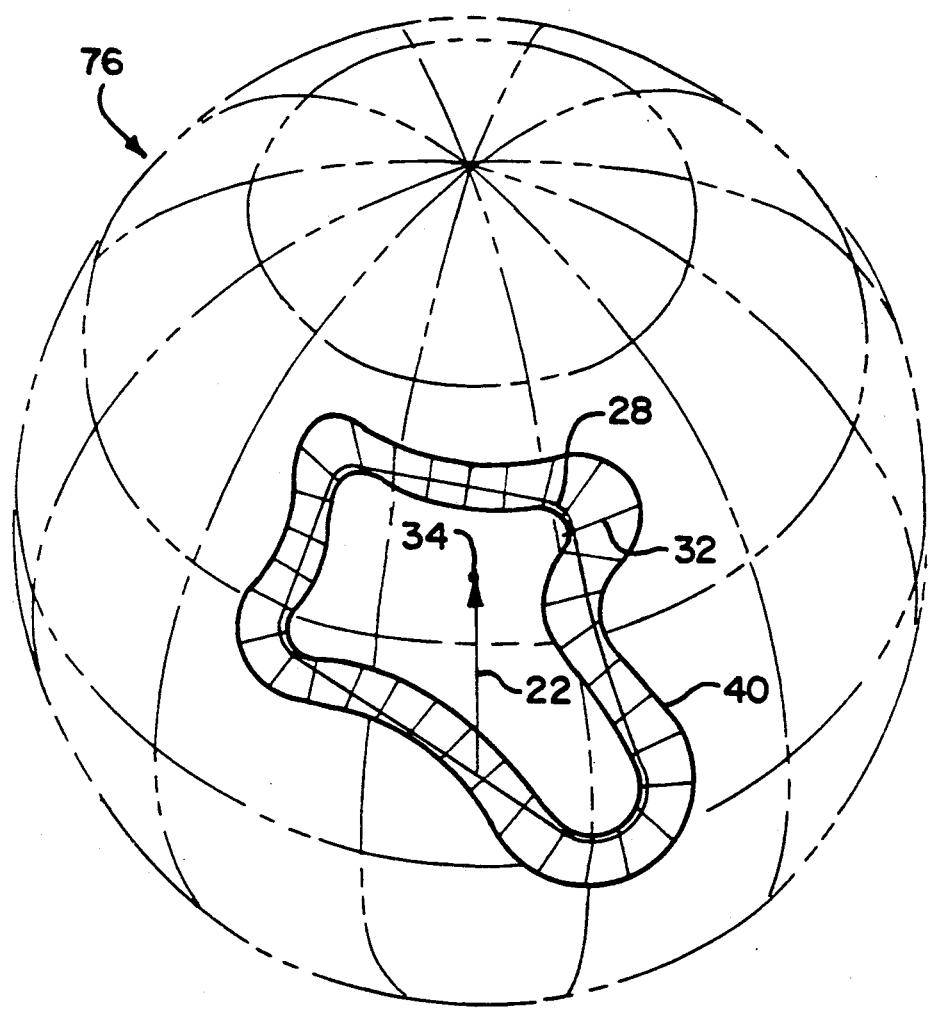
FIG. 7 is a global schematic view illustrating one embodiment of a unit sphere display to aid in the visualization of cutting tool paths.

A reference sphere 76 (as shown in FIG. 7) can be utilized to determine interferences between the cutting tool 10 and the workpiece 16, and 20. The tail 26 of each reference vector 22 is a surface point on the sphere (corresponding to a point on the course 28), while the arrow 24 projects onto the center 34 of the sphere 76 (corresponding to a point on the tool path). In this manner, the course 28 can be projected onto the external surface of the sphere, as can the allowable range 36.

The sphere 76 represents a visualization the radial component 54 and the meridional component 56 of the vector 22. There are certain courses 28 on the sphere 76 which will create either an interference or improper tool function. Therefore, whenever the reference vector approaches any of these undesirable portions, another course 28 will be selected.

Having described the invention, what is claimed is:

1. A method of determining a smooth machining course for a cutting tool during machining of a workpiece, wherein each possible cutting tool position, with respect to the workpiece, is defined by a separate reference vector, including the steps of:

defining a progression of points as a tool path to be followed by a specified first portion of the reference vector during machining of the workpiece;

generating a series of reference planes, each plane defining a planar set of all possible reference vector positions for each point;

establishing an acceptable range from each set which defines acceptable reference vector positions within each plane for each point; and generating a tool course to be followed by a second portion, distant from said first portion, of the reference vector utilizing an algorithm to minimize irregularities of the course for a given tool path, and to contain the course entirely within the acceptable range.

2. The method as defined in claim 1, wherein the acceptable range is limited to those vectors which avoid interferences between the cutting tool and the workpiece.

3. The method as defined in claim 1, wherein the acceptable range is limited to those vectors which minimize travel of a cutting machine that operates the cutting tool.

4. The method as defined in claim 1, wherein the acceptable range is limited to those vectors that minimize a length of the cutting tool that interact with the workpiece.

5. The method as defined in claim 1, wherein the acceptable range is limited to those vectors which a cutting machine which operates the cutting tool is able to perform.

6. The method as defined in claim 1, wherein the acceptable range is limited to those vectors in which travel by the cutting machine avoids substantial travel of the cutting tool with respect to the workpiece caused by methematical sensitivities.

7. The method as defined in claims 2,3,4,5 or 6, wherein a unit sphere is utilized to establish the acceptable range.

8. The method as defined in claim 1, wherein a plurality of reference planes are created for at least one of the reference points.

9. The method as defined in claim 1, wherein the tool path is defined as a path which exists a normal distance from the workpiece equal to a radius of the cutting tool.

10. The method as defined in claim 1, wherein the reference planes are oriented perpendicular to the tool path.

11. The method as defined in claim 1, wherein a parametric curve is used as the algorithm to generate the course.

12. The method as defined in claim 11, wherein a piece-wise cubic curve is used in the algorithm.

13. The method as defined in claim 1 wherein the algorithm weighs certain vectors in preference to other vectors in deriving the course.

14. The method as defined in claim 1, wherein the acceptable range is determined in a plurality of planes, the algorithm generates the course at each of the planes.

15. The method as defined in claim 14, wherein the course for the plurality of planes is then combined to form a three dimensional course.

16. The method as defined in claim 1, wherein the algorithm minimizes the dimension of the course for a given tool path.

17. A method of determining a smooth machining course for a cutting tool during machining of a workpiece, wherein each possible cutting tool position, with respect to the workpiece, is defined by a separate reference vector, including the steps of:

defining a progression of points as a tool path to be followed by a specified first portion of the reference vector during machining of the workpiece;

generating a series of reference planes, each plane defining a planar set of all possible reference vector positions for each point;

establishing an acceptable range from each set which defines acceptable reference vector positions within each plane for each point; and generating a tool course to be followed by a second portion, distant from said first portion, of the reference vector utilizing an algorithm to minimize a dimension of the course for a given tool path, and to contain the course entirely within the acceptable range.

* * * * *